(12) United States Patent
Ellis

(10) Patent No.: US 11,231,577 B2
(45) Date of Patent: Jan. 25, 2022

(54) SCOPE VIEWING APPARATUS

(71) Applicant: Alexander Ellis, Calhoun City, MS (US)

(72) Inventor: Alexander Ellis, Calhoun City, MS (US)

( * ) Notice: Subject to any disclaimer, the term of this patent is extended or adjusted under 35 U.S.C. 154(b) by 193 days.

(21) Appl. No.: 16/793,480

(22) Filed: Feb. 18, 2020

(65) Prior Publication Data

US 2020/0183144 A1 Jun. 11, 2020

Related U.S. Application Data

(63) Continuation-in-part of application No. 15/819,464, filed on Nov. 21, 2017, now abandoned.
(60) Provisional application No. 62/425,349, filed on Nov. 22, 2016.

(51) Int. Cl.
*G02B 23/16* (2006.01)
*H04N 5/225* (2006.01)

(52) U.S. Cl.
CPC ........... *G02B 23/16* (2013.01); *H04N 5/2253* (2013.01)

(58) Field of Classification Search
CPC ......... G02B 23/16; G02B 7/04; G02B 23/145
See application file for complete search history.

(56) References Cited

U.S. PATENT DOCUMENTS

| 8,279,544 | B1 | 10/2012 | O'Neill | |
|---|---|---|---|---|
| 8,911,162 | B2 * | 12/2014 | Kuehl | F16M 11/2085 396/428 |
| 9,294,659 | B1 | 3/2016 | Bednarik et al. | |
| 9,591,222 | B1 * | 3/2017 | Magrath | H04N 5/22525 |
| D860,189 | S | 9/2019 | Gu | |
| 2004/0212878 | A1 | 10/2004 | Regan et al. | |
| 2005/0078956 | A1 * | 4/2005 | Pernstich | G03B 17/48 396/428 |
| 2011/0292198 | A1 | 12/2011 | Lapstun et al. | |
| 2013/0016963 | A1 | 1/2013 | Miller | |
| 2013/0230309 | A1 * | 9/2013 | Porter | G03B 17/48 396/432 |
| 2013/0300919 | A1 | 11/2013 | Fletcher et al. | |
| 2013/0331148 | A1 * | 12/2013 | Brough | H04N 5/2252 455/557 |
| 2014/0171150 | A1 | 6/2014 | Hurst et al. | |
| 2014/0362283 | A1 | 12/2014 | Coppage et al. | |

(Continued)

OTHER PUBLICATIONS

Orion SteadyPix EZ Smartphone Telescope Photo Adaptor, available for sale since 2016.

*Primary Examiner* — George G. King
(74) *Attorney, Agent, or Firm* — Boudwin Intellectual Property; Daniel Boudwin

(57) ABSTRACT

An apparatus for projecting the view of a spotting scope onto a device is provided. The scope viewing apparatus includes a frame having a first side and a second side, the first side of the frame including mounting brackets and synchronizing blocks, wherein the synchronizing blocks lay atop the mounting brackets. The second side of the frame comprises opposing arm members perpendicularly protruding from the second side of the frame, where the opposing arm members are configured to receive a spotting scope therebetween. An interior of the synchronizing blocks is configured to slidably receive a device into an interior of the mounting brackets such that a lens of the device is aligned with an eyepiece of the spotting scope.

11 Claims, 5 Drawing Sheets

(56) References Cited

U.S. PATENT DOCUMENTS

2015/0042873 A1    2/2015  Hunt
2016/0062099 A1    3/2016  Shankar et al.
2017/0346998 A1*  11/2017  Rhoden ............... G03B 17/566

* cited by examiner

SCOPE VIEWING APPARATUS

CROSS REFERENCE TO RELATED APPLICATION

This application claims the benefit of U.S. patent application Ser. No. 15/819,464 filed Nov. 21, 2017, which claims the benefit of U.S. Provisional Application No. 62/425,349 filed on Nov. 22, 2016. The above identified patent applications are herein incorporated by reference in their entirety to provide continuity of disclosure.

FIELD OF THE INVENTION

The present disclosure relates to magnification devices with flatboard assemblies. More specifically, the present disclosure provides combination spotting scopes and corresponding frame assemblies.

BACKGROUND OF THE INVENTION

A demand for improved device magnification has developed with the development of a variety of hand-held devices and tablets, including but not limited to, Apple Inc.'s IPAD® devices (from Apple Inc. of Cupertino, Calif.), Android™ operating system from Google Inc. (from Google Inc. of Mountain View, Calif.), and the like. These devices typically have a varying degree of pixels and capabilities, such as "zooming-in/out" to improve the magnification of an object. With each device update, a new "generation" is released that has improved magnification abilities. For example, a second-generation iPad has improved pixel resolutions and improved "zooming-in/out" capabilities when compared with a preceding first generation.

Unfortunately, even with each device's improved magnification ability, there is still demand for magnification improvement. The demand relies on the release of an updated device "generation." Many people make an effort to supplement magnification with external devices.

SUMMARY OF THE INVENTION

Therefore, disclosed herein is an apparatus configured to synchronize a device with increased magnification, such as a spotting scope, with another device, such as a tablet, such that the apparatus can provide an enlarged view of an image in the spotting scope's view on a display of an electronic device.

In view of the foregoing, disclosed herein is a scope viewing apparatus comprising a frame comprising a first side and a second side. The first side of the frame comprises mounting brackets and synchronizing blocks, wherein the synchronizing blocks lay atop the mounting brackets. The second side of the frame comprises opposing arm members perpendicularly protruding from the second side of the frame, wherein the opposing arm members are configured to receive a spotting scope therebetween. Moreover, an interior of the synchronizing blocks is configured to slidably receive a device into an interior of the mounting brackets such that a lens of the device is aligned with an eyepiece of the spotting scope.

It is another object of the present disclosure to provide at least one base to the frame and the opposing arm members attach.

It is another object of the present disclosure to provide the synchronizing blocks laying atop the mounting brackets such that the interior of the mounting brackets and the interior of the synchronizing blocks form a channel.

It is yet another object of the present disclosure to provide a frame comprising at least one aperture adjacent at least one corner of the frame.

Yet another object of the present disclosure is to provide the opposing arm members mounted to the second side of frame.

Another object of the present disclosure is to provide the two opposing arm members protruding perpendicularly at a perpendicular orientation relative to the mounting brackets.

Another object of the present disclosure is to provide at least one of the opposing arm members comprising at least one groove.

Yet another object of the present disclosure is to provide at least one brace attached to at least one of the opposing arm members.

Another object of the present disclosure is to provide at least one of the opposing arm members comprising at least one handle extending along a side of the at least one opposing arm members.

Yet another object of the present disclosure is to provide at least one of the opposing arm members comprises at least one aperture extending along a bottom corner of the at least one opposing arm members. The present disclosure may be readily fabricated from materials that permit relative economy and are commensurate with durability.

Also disclosed herein is a scope viewing apparatus comprising a frame comprising a first side and a second side; the first side of the frame comprises mounting brackets and synchronizing blocks, where the synchronizing blocks lay atop the mounting brackets; the second side of the frame comprises opposing arm members perpendicularly protruding from the second side of the frame; and a spotting scope between the opposing arm members. Moreover, an interior of the synchronizing blocks slidably receives a device into an interior of the mounting brackets such that a lens of the device is aligned with an eyepiece of the spotting scope.

Another object of the present disclosure is to provide the spotting scope comprising at least one magnification dial and at least one focus adjustment dial.

BRIEF DESCRIPTIONS OF THE DRAWINGS

Although the characteristic features of this disclosure will be particularly pointed out in the claims, the disclosure itself and manner in which it may be made and used may be better understood after a review of the following description, taken in connection with the accompanying drawings wherein like numeral annotations are provided throughout.

DETAILED DESCRIPTION OF THE INVENTION

Figure 1:
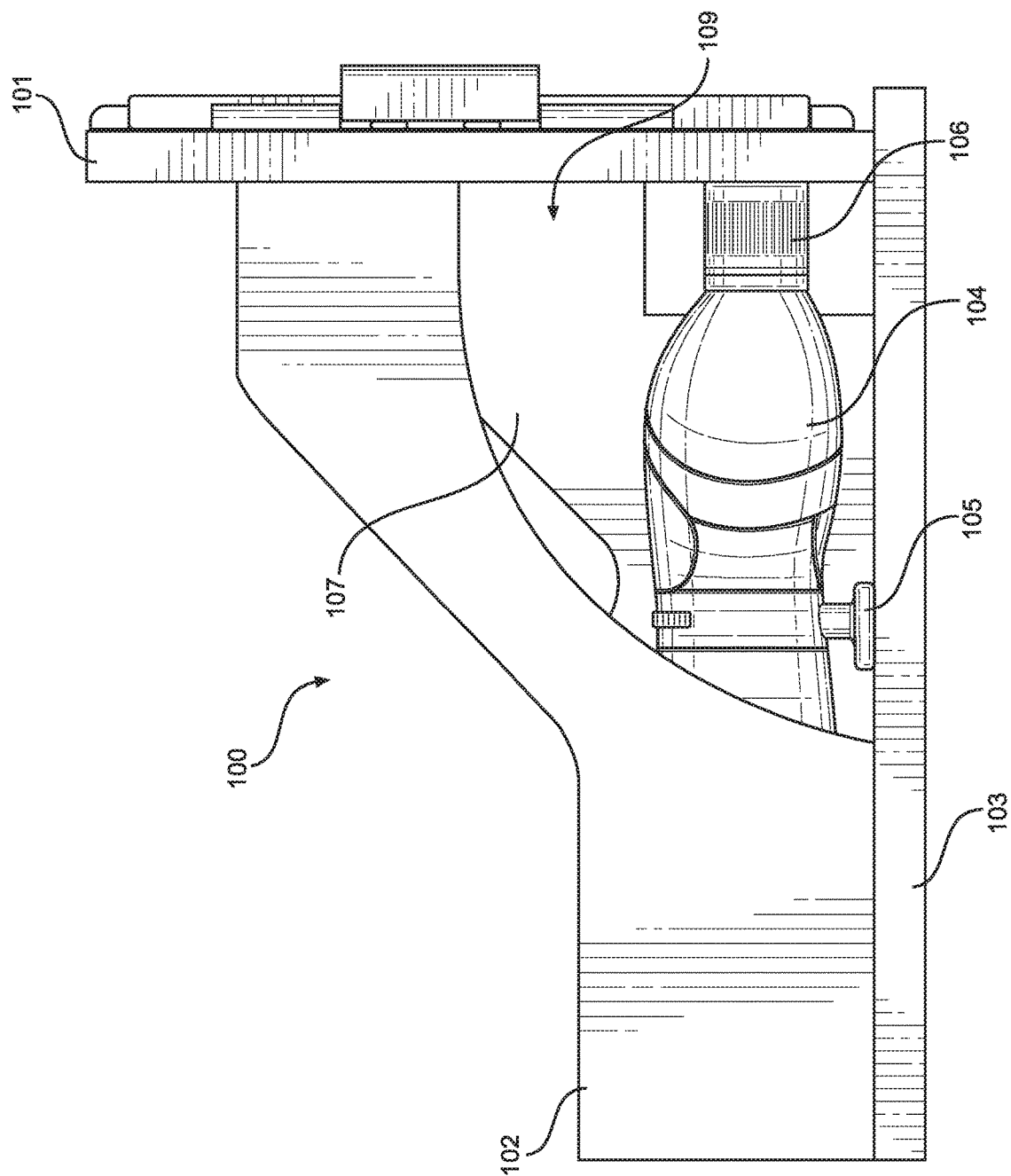
FIG. 1 shows a side view of an embodiment of the scope viewing apparatus.

Reference is made herein to the attached drawings. Like reference numerals are used throughout the drawings to depict like or similar elements of the scope viewing apparatus. For the purposes of presenting a brief and clear description of the present invention, the preferred embodiment will be discussed as used for a spotting scope and corresponding frame assembly. The figures are intended for representative purposes only and should not be considered to be limiting in any respect.

Referring now to FIG. 1, there is shown a side view of an embodiment of the scope viewing apparatus. The scope viewing apparatus is comprised of a housing 100. In one embodiment the housing 100 is made from wood. In another embodiment the housing 100 is made from plastic. In yet a further embodiment the housing 100 is made from other suitable materials. The housing 100 is comprised of a base 103. In one embodiment the base 103 is a planar base. The base 103 has a front face 101 rising therefrom. In one embodiment the front face 101 is a planar surface as well. In one embodiment the front face 101 is connected to the base 103 such that it is perpendicular to the base 103.

The front face 101 and the base 103 have a pair of sidewalls 102, 107 attached thereto. In one embodiment a first sidewall 102 rises from one side of the base 103 and the second sidewall 107 rises from an opposite side of the base 103. In one embodiment the sidewalls 102, 107 are connected to the base 103 in a perpendicular manner. The sidewalls 102, 107 are further connected to the front face 101 in a perpendicular manner. In this embodiment the housing 100 is a rectangular housing.

Figure 3:
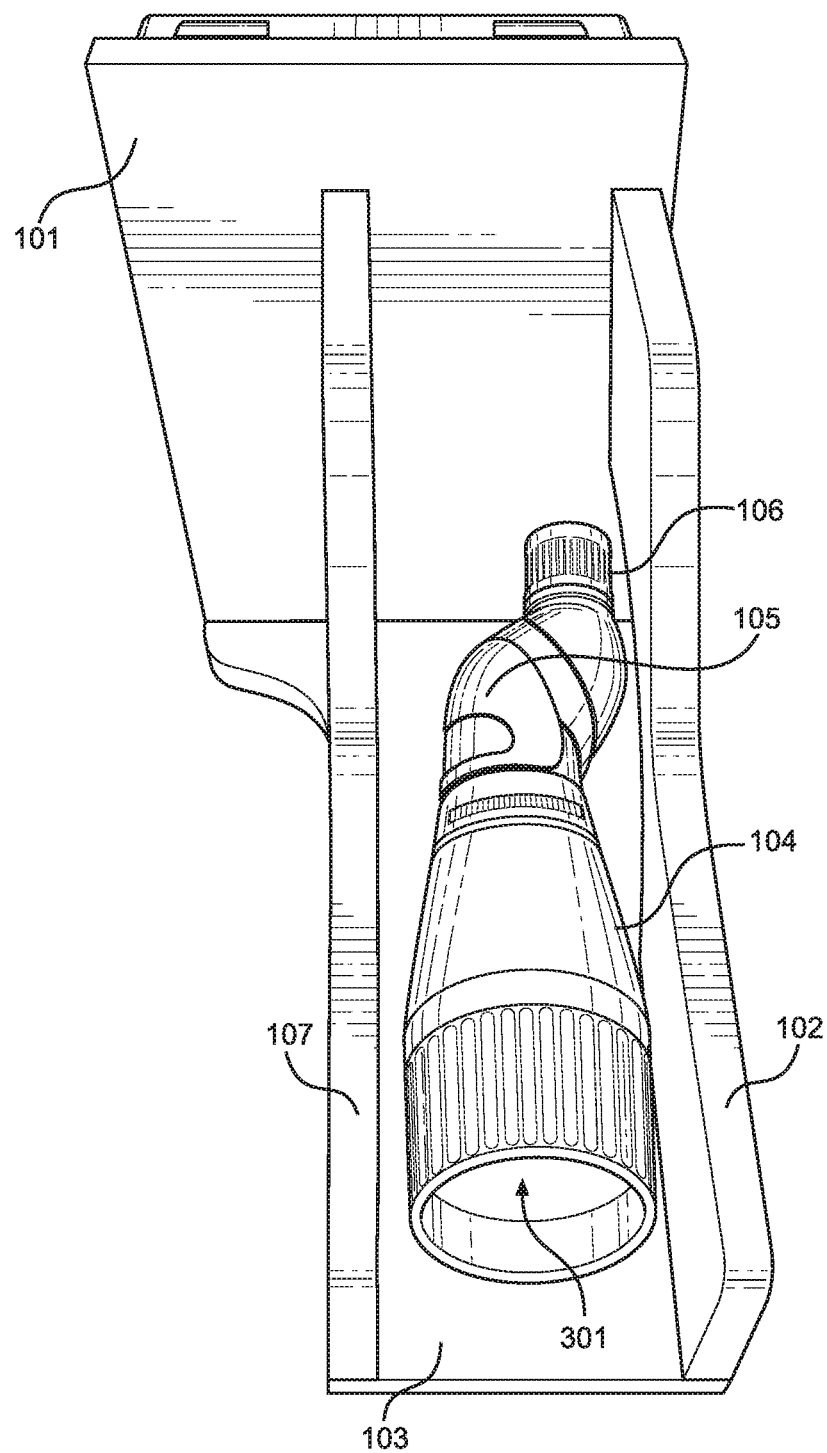
FIG. 3 shows a perspective view of an embodiment of the scope viewing apparatus.

From the shown side view a first sidewall 102 can be seen. The first sidewall 102 has an opening 109 therethrough. Through this opening there is shown a telescope 104. In one embodiment the telescope 104 is a spotting scope. The telescope 104 is secured to the base 103 using a mounting bracket 105. The lower part of the mounting bracket 105 is shown here whereas an upper part of the mounting bracket 105 is shown in FIG. 3. The mounting bracket 105 is secured to the base 103. The mounting bracket 105 is configured to wrap around the telescope 104. This configuration will hold the telescope 104 in place.

The telescope 104 includes an eye piece 106. In one embodiment the eye piece 106 is an adjustable eye piece. This will allow the telescope 104 to be focused. The eye piece 106 is positioned such that it is pressed against the front face 101. This positioning will be discussed more throughout.

Figure 2:
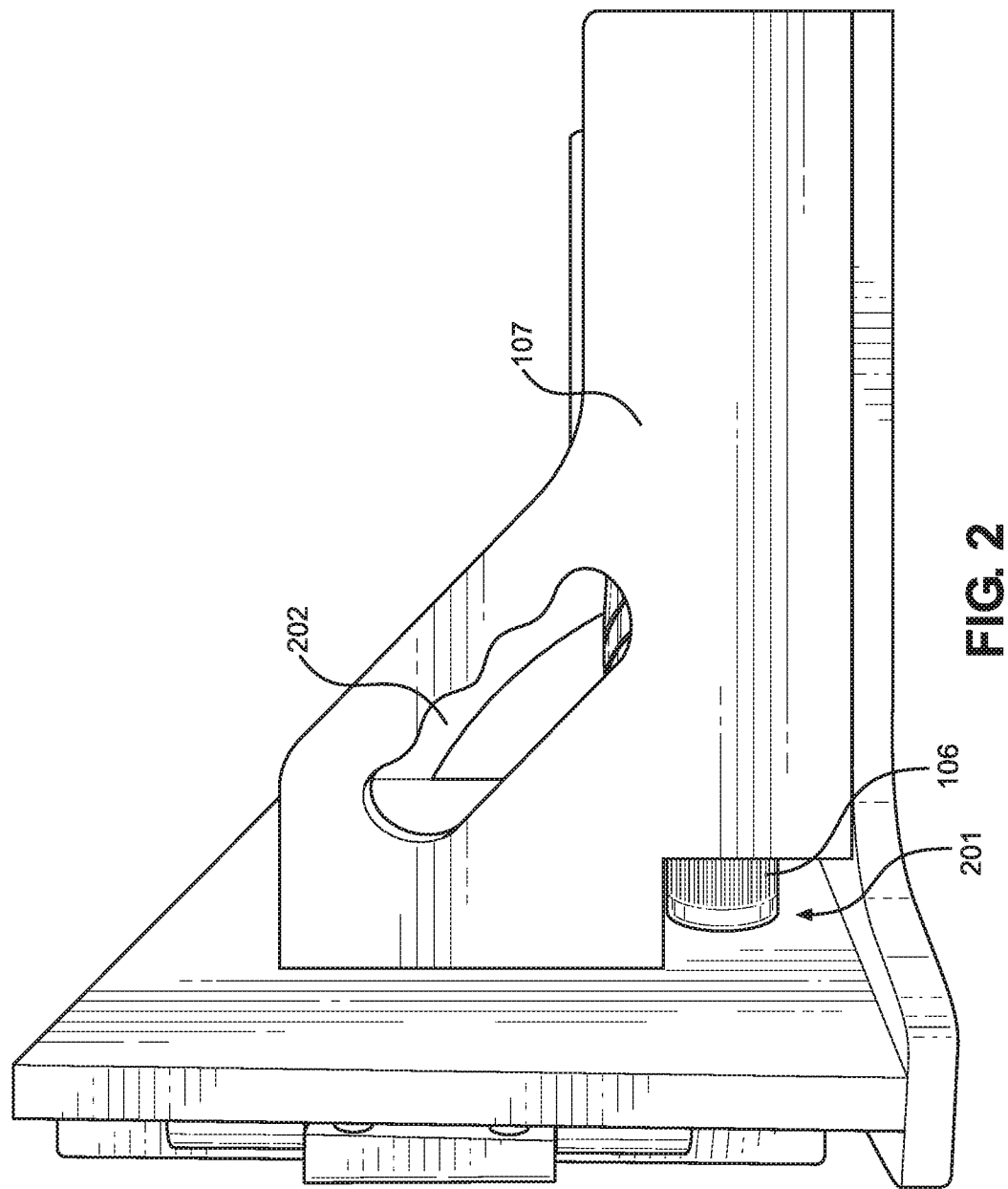
FIG. 2 shows a side view of an embodiment of the scope viewing apparatus.

Referring now to FIG. 2, there is shown a side view of an embodiment of the scope viewing apparatus. The second sidewall 107 is shown. In one embodiment the second sidewall 107 has a grip section 202. In one embodiment the grip section 202 is formed from an aperture placed through the second sidewall 107. In one embodiment the aperture is ergonomic. This will allow the grip section 202 to comfortably fit a hand.

In one embodiment the second sidewall 107 has a second aperture 201. This second aperture 201 is located such that the eye piece 106 of the telescope is accessible. The second aperture 201 will allow a user to adjust the eye piece 106. This second aperture 201 will provide convenience to a user when focusing the telescope. The second aperture will allow a user to be able to focus the telescope from either side of the device.

Referring now to FIG. 3, there is shown a perspective view of an embodiment of the scope viewing apparatus. The telescope 104 is shown to be positioned between the first sidewall 102 and the second sidewall 107. The telescope 104 is attached to the base 103 using the mounting bracket 105 as described above. From this view it is shown that the objective lens 301 of the telescope is pointed opposite the eye piece and away from the front face 101.

In the shown embodiment the telescope 104 is not a straight scope. In one embodiment the telescope 104 has a bent section. In this embodiment the mounting bracket 105 is configured to fit about the bend in the telescope 104. In the shown embodiment the mounting bracket 105 comprises an arcuate plate tapering from a first end towards a second end, such that the plate conforms to the bend in the telescope 104. This will help hold the eye piece 106 of the telescope 104 against the front face 101.

Figure 4:
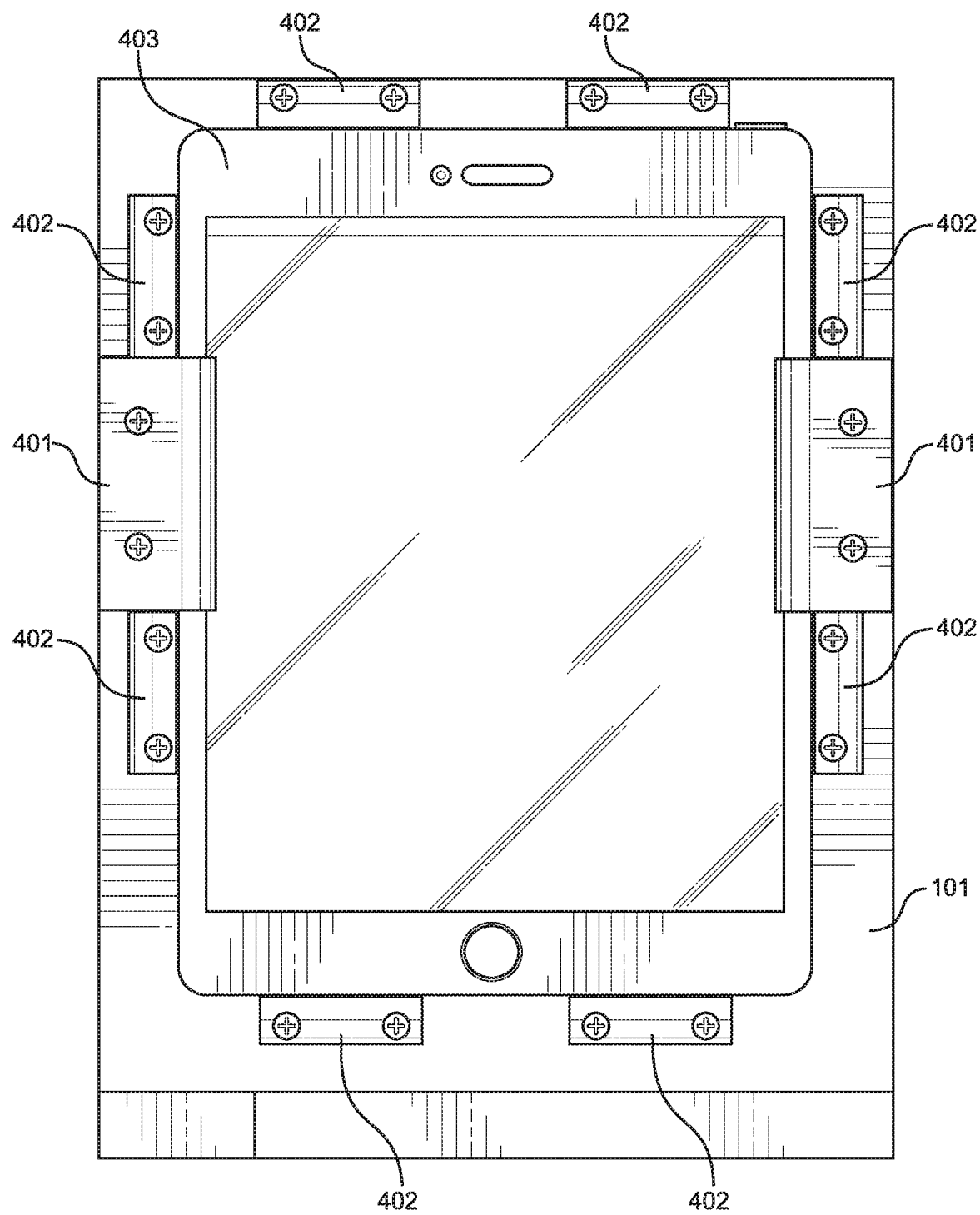
FIG. 4 shows a front view of an embodiment of the scope viewing apparatus.

Referring now to FIG. 4, there is shown a front view of an embodiment of the scope viewing apparatus. In the front view of the scope viewing apparatus there is shown an electronic device 403 secured to the front face 101. In one embodiment the electronic device 403 is a mobile device. The electronic device 403 has a camera lens that will be placed facing the front face 101. A further description of this arrangement is presented below in the description of FIG. 5.

The electronic device 403 is held in place with a plurality of device securement blocks 401. The device securement blocks 401 will be removably secured to the front face 101. The device securement blocks 401 are configured to partially overlap the electronic device 403 holding it in place. The device securement blocks 401 are configured to be loosened or moved away from the front face 101 to remove the electronic device 403. The securement blocks 401 are further configured to be tightened or moved toward the front face 101 to secure the electronic device 403.

The electronic device 403 is further held in place with a plurality of synchronizing blocks 402. The synchronizing blocks 402 are secured to the front face 101 about the perimeter of the electronic device 403. In one embodiment the synchronizing blocks 402 are permanently secured to the front face 101. In another embodiment the synchronizing blocks 402 are removably secured to the front face 101. In one embodiment there are two synchronizing blocks 402 per side of the electronic device 403. The synchronizing blocks 402 serve to hold the electronic device 403 steady. By using the synchronizing blocks 402 the electronic device 403 can be inserted and removed by only adjusting a minimal number of device securement blocks 401. Without the synchronizing blocks 402 more device securement blocks 401 would be required.

Figure 5:
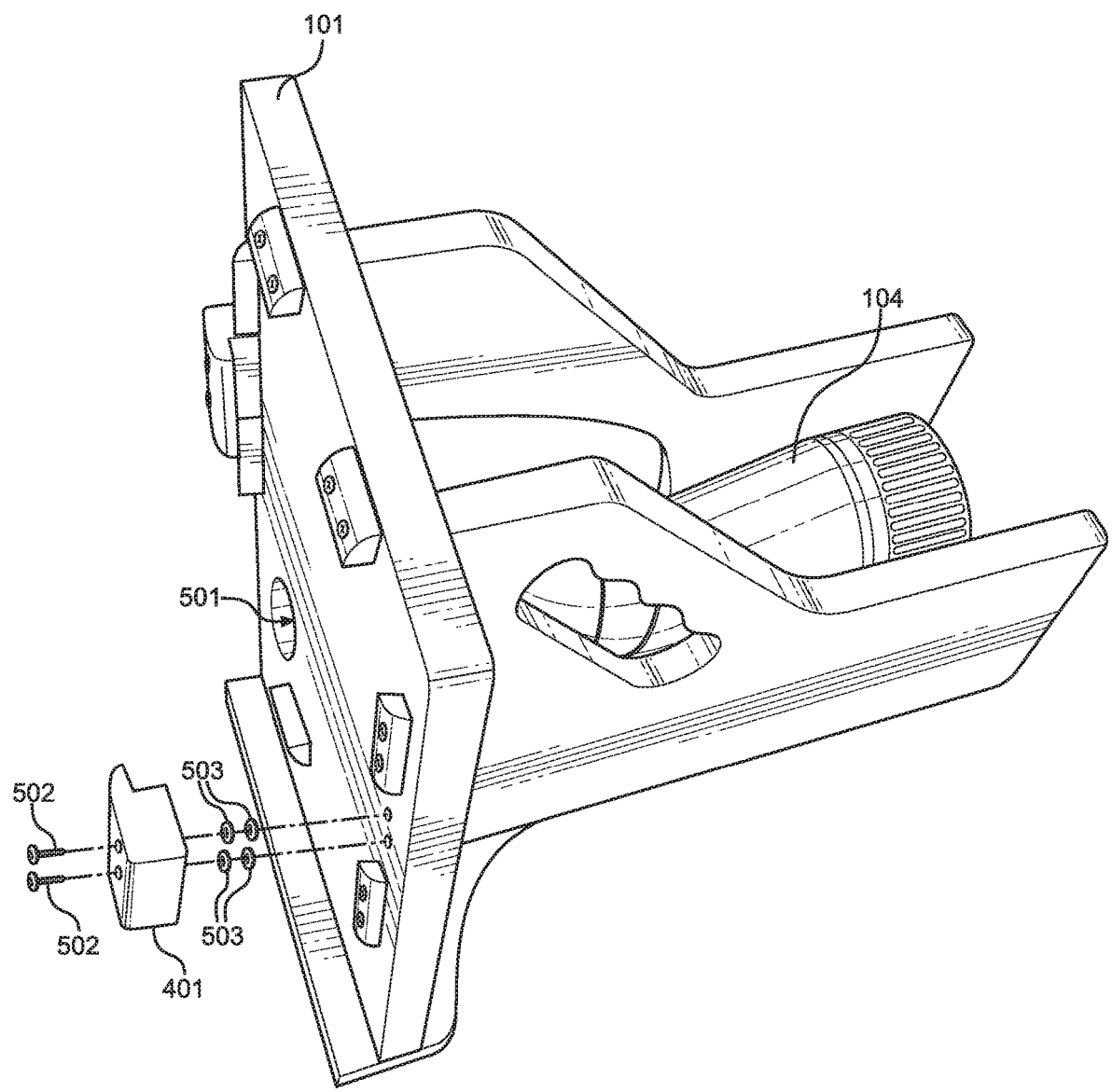
FIG. 5 shows a partially exploded view an embodiment of the scope viewing apparatus.

Referring now to FIG. 5, there is shown a partially exploded view an embodiment of the scope viewing apparatus. In this view there is shown an aperture 501 located through the front face 101. This aperture will allow for a camera lens of the mobile device to point therethrough. This aperture 501 will further be aligned with the eye piece of the telescope 104.

In this view the securement blocks 401 are removed from the front face 101. In the shown embodiment the securement blocks 401 are removably secure with screws 502. In other embodiments the securement blocks 401 may be held in place with other securement devices. In this view the securement blocks 401 are shown to have an L shape defining a lip configured to extend over the electronic device. This will allow for the sides and top of the electronic device to be secured to the front face 101.

Further there is at least one washer 503 located between the securement block 401 and the front face 101. In one embodiment the washers 503 are flexible washers. This will allow the washers 503 to be crushed. This will allow the securement blocks 401 to be tightened against the front face 101 without crushing the screen of the electronic device.

It is therefore submitted that the instant disclosure has been shown and described in what is considered to be the most practical and preferred embodiments. It is recognized, however, that departures may be made within the scope of the disclosure and that obvious modifications will occur to a person skilled in the art. With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A scope viewing apparatus comprising:
   a housing comprising a first sidewall and a second sidewall connected to a front face;
   the front face comprises securement blocks and synchronizing blocks; and
   at least one mounting bracket;
   wherein the first sidewall and the second sidewall are configured to receive a telescope substantially therebetween;
   the front face includes an aperture;
   the mounting bracket is configured to secure the telescope to the housing such that an eyepiece of the telescope can be aligned with the aperture;
   the synchronizing blocks are configured to slidably receive an electronic device having a lens the such that the lens of the electronic device can be aligned with the eyepiece of the telescope through the aperture; and the securement blocks are configure to hold the electronic device in place.

2. The scope viewing apparatus of claim 1, further comprising at least one base to which the front face, the first sidewall, and the second sidewall are attached.

3. The scope viewing apparatus of claim 1, wherein the first sidewall and the second sidewall are perpendicular to the front face.

4. The scope viewing apparatus of claim 1, wherein at least one of the sidewalls has a gripping section therein.

5. A scope viewing apparatus comprising:
   a housing comprising a first sidewall and a second sidewall connected to a front face and a base;
   the front face comprises securement blocks and synchronizing blocks; and
   at least one mounting bracket;
   wherein the first sidewall and the second sidewall are configured to receive a telescope substantially therebetween,
   the front face includes an aperture;
   the telescope is connected to the base by the mounting bracket such that an eyepiece of the telescope can be aligned with the aperture;
   the synchronizing blocks are configured to slidably receive an electronic device having a lens such that the lens of the electronic device can be aligned with an eyepiece of the telescope through the aperture; and
   the securement blocks are configure to hold the electronic device in place.

6. The scope viewing apparatus of claim 5, wherein the base is attached to the front face, the first sidewall, and the second sidewall.

7. The scope viewing apparatus of claim 5, wherein the first sidewall and the second sidewall are perpendicular to the front face.

8. The scope viewing apparatus of claim 5, wherein at least one of the sidewalls has a gripping section therein.

9. The scope viewing apparatus of claim 5, wherein the telescope comprises at least one magnification dial and at least one focus adjustment dial.

10. The scope viewing apparatus of claim 5, wherein the telescope is a spotting scope.

11. The scope viewing apparatus of claim 5, further comprising washers located between the securement blocks and the front face.

* * * * *